(12) United States Patent
Flanders

(10) Patent No.: US 6,542,659 B2
(45) Date of Patent: Apr. 1, 2003

(54) OPTICAL SPECTRUM ANALYZER WITH BEAM SWITCH ARRAY

(75) Inventor: Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/727,856

(22) Filed: Dec. 1, 2000

(65) Prior Publication Data

US 2002/0067895 A1 Jun. 6, 2002

(51) Int. Cl.[7] ............................................... G02B 6/26
(52) U.S. Cl. ............................ 385/20; 385/88; 385/22
(58) Field of Search ............................... 385/11, 33–37, 385/31, 39, 47, 88, 89, 90, 92, 93, 24, 16, 14, 22; 359/124, 128; 372/20, 32, 50, 64; 349/117

(56) References Cited

U.S. PATENT DOCUMENTS

| | | | | |
|---|---|---|---|---|
| 4,696,059 A | * | 9/1987 | MacDonald et al. ......... | 455/600 |
| 5,396,359 A | | 3/1995 | Abramovitz ................. | 359/127 |
| 5,414,214 A | * | 5/1995 | Cho et al. .................. | 174/52.3 |
| 5,488,500 A | * | 1/1996 | Glance ....................... | 359/127 |
| 5,550,373 A | * | 8/1996 | Cole et al. ................. | 250/338.1 |
| 5,661,835 A | * | 8/1997 | Kato et al. ................. | 385/92 |
| 5,721,430 A | * | 2/1998 | Wong ....................... | 250/339.13 |
| 5,859,717 A | * | 1/1999 | Scobey ........................ | 359/124 |
| 5,969,834 A | | 10/1999 | Farber et al. ............... | 359/110 |
| 6,156,483 A | * | 12/2000 | McCoy et al. .............. | 430/311 |
| RE37,044 E | * | 2/2001 | Wu ............................ | 349/117 |
| 6,198,857 B1 | * | 3/2001 | Grasis et al. .................. | 385/24 |
| 6,226,424 B1 | * | 5/2001 | Ball et al. ..................... | 385/14 |
| 6,227,724 B1 | * | 5/2001 | Verdiell ....................... | 385/91 |
| 6,272,157 B1 | * | 8/2001 | Broutin et al. ................ | 372/32 |
| 6,292,299 B1 | * | 9/2001 | Liou .......................... | 359/583 |
| 6,330,255 B1 | * | 12/2001 | Hung .......................... | 372/20 |
| 6,377,720 B1 | * | 4/2002 | Kokkelink ................... | 385/11 |
| 6,243,403 B1 | * | 5/2002 | Broutin et al. ................ | 372/32 |

FOREIGN PATENT DOCUMENTS

WO     WO 01/37471 A2     5/2001     ............ H04J/14/00

\* cited by examiner

*Primary Examiner*—Michael P. Stafira
*Assistant Examiner*—Michael P Mooney
(74) *Attorney, Agent, or Firm*—J. Grant Houston

(57) ABSTRACT

An optical spectrum analyzer includes an integrated beam switch array. As a result, a single spectrum analyzer can be amortized across multiple optical links with pigtails transmitting the optical signals from separate optical links. The switch array providing one of the optical signals as an input signal to the optical spectrum analyzer.

21 Claims, 2 Drawing Sheets

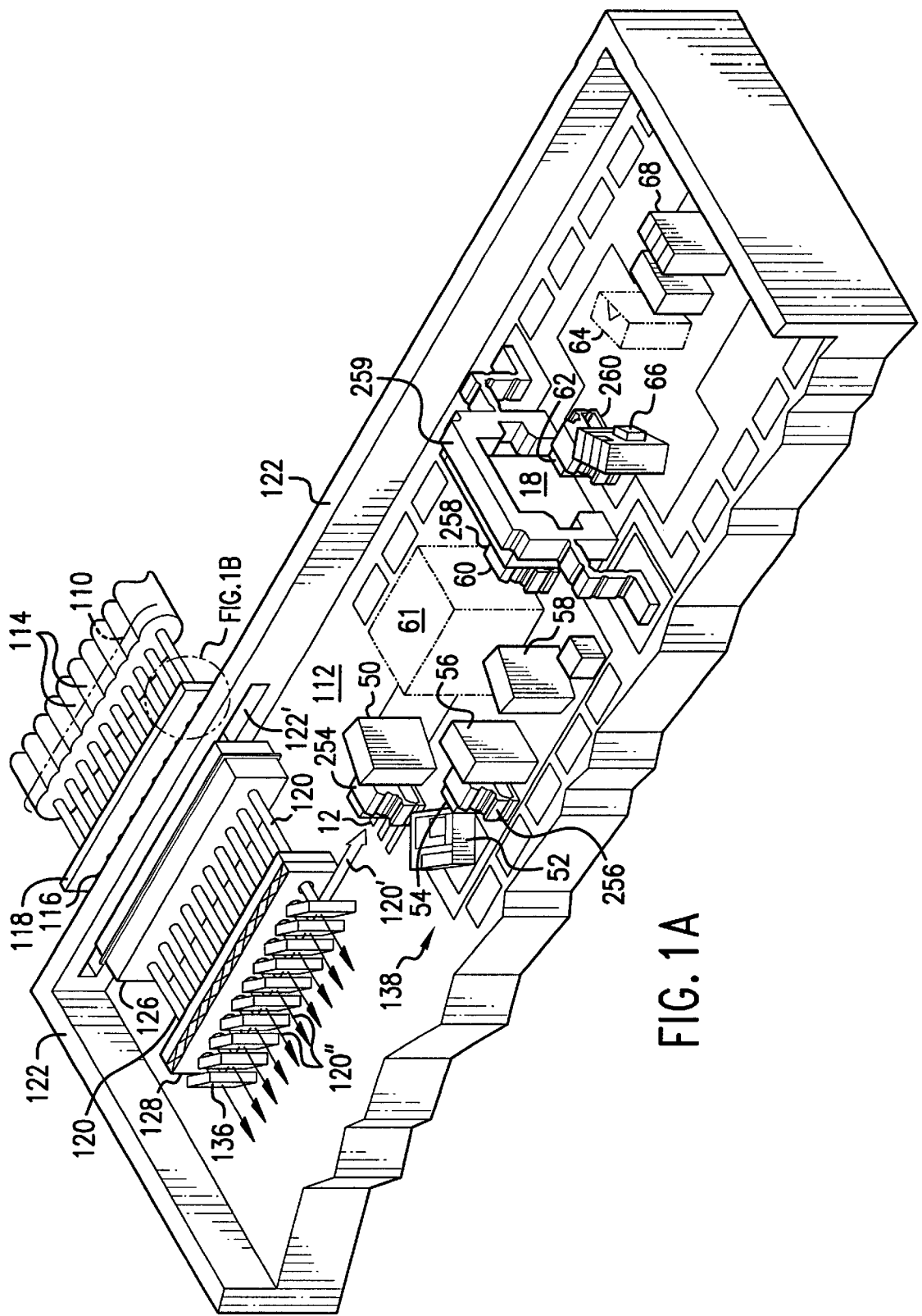

OPTICAL SPECTRUM ANALYZER WITH BEAM SWITCH ARRAY

BACKGROUND OF THE INVENTION

Optical spectrum analyzers typically comprise a tunable filter that bandpass filters an input signal. A detector is used to measure the filtered signal and thereby determine the optical power within the filter's current pass band.

Analyzers have relevance to many applications requiring optical spectrum analysis. Such applications span LIDAR to remote chemical analysis, for example. Presently, however, one of the most active applications is in the area of data transmission systems utilizing wavelength division multiplexing (WDM).

WDM systems typically comprise multiple separately modulated laser diodes at the transmitter. These laser diodes are tuned to operate at different wavelengths. When combined in an optical fiber, the WDM optical signal comprises a corresponding number of spectrally separated channels. Along the transmission link, the channels are typically collectively amplified in gain fiber, such as erbium-doped fiber and/or regular fiber, in a Raman pumping scheme. At the receiving end, the channels are usually separated from each other using thin film filter systems, for example, to thereby enable detection by separate photodiodes.

The advantage of WDM systems is that the transmission capacity of a single fiber can be increased. Historically, only a single channel was transmitted in each optical fiber. In contrast, modern WDM systems contemplate hundreds of spectrally separated channels per fiber. This yields concomitant increases in the data rate capabilities of each fiber. Moreover, the cost per bit of data for WDM systems is typically less than comparative non-multiplexed systems. This is because any amplification system required along the link can be shared by all of the separate channels transmitted on the link. With non-multiplexed systems, each channel/fiber would require its own amplification system.

The economics pulling for WDM in the context of long-haul optical links is only one factor suggesting the long-term applicability of the technology. Another application concerns the dynamic routing of individual wavelength slots or channels. This is sometimes referred to as metro WDM.

Nonetheless, there are challenges associated with implementing WDM systems. First, the transmitters and receivers are substantially more complex since, in addition to the laser diodes and receivers, additional optical components are required to combine the channels into, and separate out the channels from, the WDM optical signal. Moreover, there is the danger of channel drift where the channels lose their spectral separation and overlap each other. This interferes with channel separation and demodulation at the receiving end.

In order to ensure that proper guard bands are maintained between adjacent channels and to also ensure that the carrier frequencies or wavelengths of the channels are correct both relative to other channels and relative to their wavelength assignments, optical monitoring systems are required in most WDM transmission systems. They are also useful in WDM channel routing systems, such as add/drop multiplexers and switches to ensure that the specific optical channels are being properly controlled. Further, information concerning the relative and absolute powers in the optical channels is important as feedback to variable attenuators, for example, and to combat gain tilt.

SUMMARY OF THE INVENTION

One problem associated with these spectrum analyzers is their expense, which slows their advance toward the network edge and adds incrementally to the deployment costs for WDM systems, for example. However, as the operation and stability of WDM systems are refined and as the speed of spectrum analyzers is increased, it becomes less necessary for a spectrum analyzer to be dedicated to monitoring each optical link.

The present invention concerns an optical spectrum analyzer that includes an integrated beam switch array. As a result, a single spectrum analyzer can be amortized across multiple optical links with pigtails transmitting the optical signals from separate optical links to the analyzer. The switch array provides one of the optical signals as an input signal to the optical spectrum analyzer. Further, the invention also concerns an analyzer with this functionality that is further capable of being integrated into a small package to be used as a subsystem, or possibly even as a stand-alone system, in a WDM system, or other application requiring optical spectral monitoring.

In general, according to one aspect, the invention features an optical spectrum monitoring system. The system comprises a bench and fiber pigtails terminating at the bench. A tunable filter is further connected to the bench and functions to filter an input optical signal. An array of beam switches, connected to the bench, selectively provides the optical signals from the fiber pigtails as the input optical signal to the tunable filter.

In general, according to another aspect, the invention features a method. Specifically, the method comprises providing optical signals to an optical bench and selectively providing one of the optical signals to a tunable filter. A filtered signal from the tunable filter is then detected.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 1A and 1B are perspective views of an optical spectrum analyzer with integrated beam switch array, according to the present invention.

DETAILED DESCRIPTION OF THE PREFERRED EMBODIMENTS

Figure 1B:
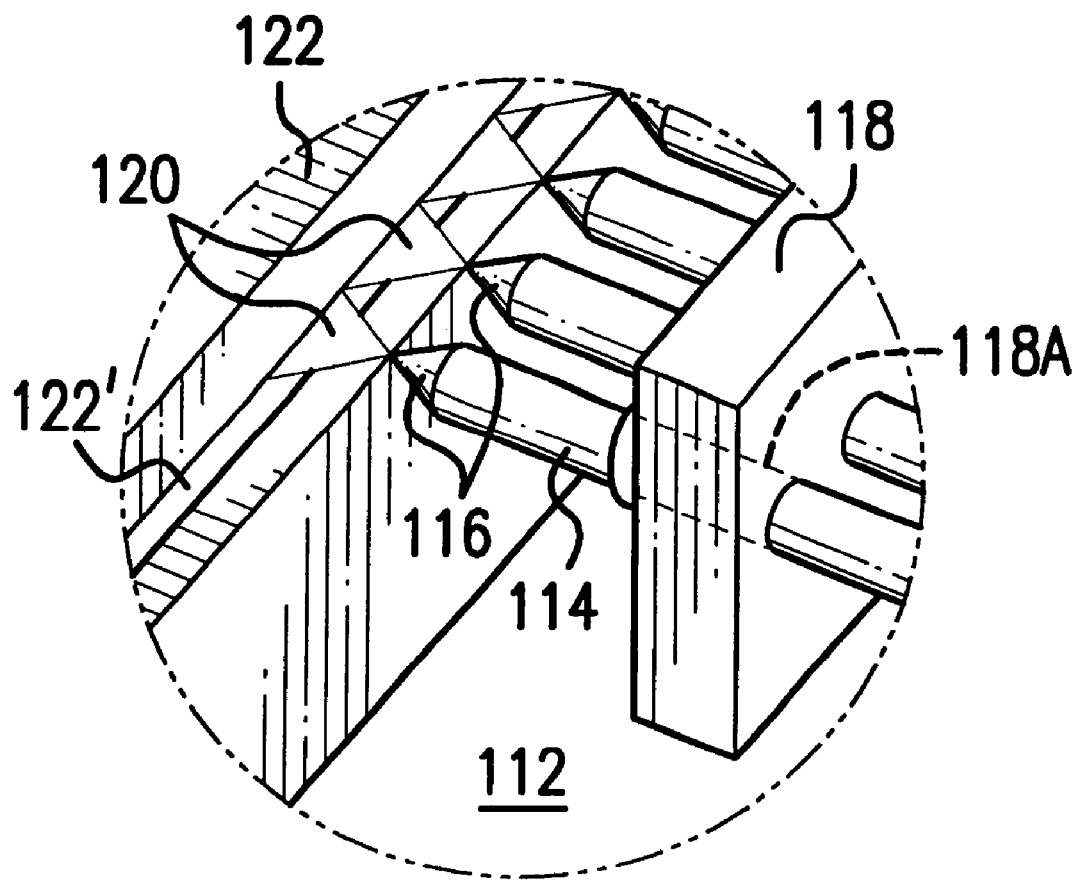

The figures show an optical spectrum analyzer with integrated beam switch array, which has been constructed according to the principles of the present invention.

Specifically, an array of fiber pigtails 110 is secured to the substrate or optical bench 112 of the system. In the specific implementation illustrated, the array of fibers 110 comprises ten separate optical fibers 114. Each one of these fibers has an endface 116 that is secured to the bench 112 via a fiber mounting structure 118.

In more detail, each one of the separate fibers projects through a port 118A in the fiber mounting structure 118 such that its endface 116 is held in a fixed relationship to the optical bench 112 (see FIG. 1B). In one implementation, each endface 116 comprises a fiber lens to improve the collimation of light emitted from the respective fiber.

The beams 120 that are emitted from the endfaces 116 of the fibers 114 are transmitted through a window structure 122' in the hermetic package sidewall 122 into the hermetic region of the system. This specific configuration has advantages surrounding the fact that epoxies and other organic compounds can be used to secure the endfaces 116 to the bench 112. These compounds are separated from the other components by the hermetic boundary of the package sidewalls 122. Note that for the purposes of illustration, the package lid is not shown.

In an alternative configuration, the pigtails extend across a hermetic boundary, through fiber feedthroughs in the package sidewalls and terminate within the hermetic enclosure. This alternative implementation is more common in the current state of technology.

In the illustrated embodiment, the beams 120 enter a first isolator system 126. This isolator system 126 prevents backreflections into the fiber endfaces 116.

The beams 120 emitted from the first isolator system 126 enter a collimator lens array 128. This collimator lens array comprises, in the preferred or current embodiment, separate discrete lenses formed using the mass transport lens process as described in, for example, U.S. Pat. No. 5,618,474, the teachings of which are incorporated herein by this reference in their entirety. These separate lenses of the lens array 128, focus or improve the collimation of the beams 120 so that a beam waist is formed typically. Generally, the beam diameters at the lenses are less than 250 micrometers ($\mu$m), preferably less than 100 $\mu$m.

In another implementation, the first collimator array is located closer to the fiber endfaces, with the endfaces being cleaved. In one such implementation, the isolator system 122 is effectively moved as described below.

The beams 120 exiting from the lens array 128 pass to an array of optical filter switches 136. In the illustrated embodiment, these switches are aligned in a row, this row being parallel to a surface of the bench 112, but extending orthogonally to the optical axes of the beams 120.

In the illustrated embodiment, the individual switches of the filter switch array 136 are "rollershade" switches as described in U.S. Pat. No. 5,784,189, for example. This configuration, however, is simply the illustrated implementation. The present invention is compatible with other beam switching strategies, such as tilt mirror arrays.

Further, in the illustrated implementation, during operation, one of the switches in array 136 is activated to convert from a transmissive state to a reflective state. This allows the selected beam to be redirected to enter the filter system 138 as the input signal 120', possibly through other switches in the array that are in a transmissive state by propagating through the optical ports of the switches. Specifically, in an unactivated state, the switches allow the beams to pass through the optical ports of the respective switches (see beams 120"). When one of the switches is activated, the corresponding beam is reflected at 90 degrees to be input signal 120' to a tunable filter system 138.

In the preferred embodiment, this tunable filter system 138 bandpass filters the input signal with a tunable passband so that it can assess the optical power in a single optical channel slot in a WDM signal of one of the beams 120 when used as a WDM signal analyzer.

The input optical signal 120' is typically diverging as it is transmitted from the switch array 136. It is again collimated or has its collimation improved by first lens 12. Preferably, the radii of curvatures of the lens in array 128 are different due to the different path lengths between the first lens 12 of the filter system 138 and the lens array 128.

A dichroic mirror 50 is used to add a reference signal to the input optical signal 120' when such reference signal is required by the application. These dichroic mirrors or filters are typically referred to as WDM filters. In the illustrated implementation, the WDM filter 50 is reflective in a band surrounding 1300 nanometers (nm) or 1400 nm, but transmissive in a band surrounding 1500 nm.

In the illustrated embodiment, the 1300 nm reference signal is generated by a light emitting diode 52. In one implementation, the light emitting diode is a super luminescent light emitting diode (SLED). Alternatively, a 1400 nm source is used.

The diverging beam from the SLED is collimated by a collimating lens 54. An etalon 56 is used to convert the relatively wide-band signal from the SLED into a reference signal with stable spectral characteristics. More specifically, the etalon 56 functions as a Fabry-Perot filter with a 200 GigaHertz (GHz) free spectral range (FSR). This converts the SLED's continuous, broadband spectrum into a signal with energy peaks every 200 GHz. These peaks are stable, particularly when the temperature of the system is controlled by a thermoelectric cooler or is otherwise stabilized.

A fold mirror 58 redirects the reference signal to the WDM filter 50. It should be noted, however, that this mirror is not required, but is simply used to facilitate integration of the system on a more compact bench.

The combined optical signal is transmitted through an isolator 61 in an alternative embodiment. This component is used to prevent back-reflections from the subsequent optical components into the fibers 110. Typically, however, only one isolator for the system is required. Thus, generally either isolator 126 or isolator 61 is installed in the system, not both.

A second lens 60 is used to focus the collimated combined beam onto tunable filter 18. After the tunable filter, the beam is recollimated by a third collimating lens 62, and transmitted to a second dichroic/WDM filter 64.

The second WDM filter 64 functions to separate the filtered reference signal from the filtered input optical signal in the filtered beam from the tunable filter 18. In the illustrated implementation, the second WDM filter 64 is reflective in a band around 1300 nm, but transmissive in a band around 1500 nm. As a result, the filtered reference signal is directed to the wavelength reference detector 66 for optical-electrical conversion.

The filtered optical signal is transmitted to a signal detector 68. Depending on the implementation, bandwidth, and free spectral range of filter 18, this detector operates for the S, L, and/or C bands.

Turning to specifics of the single bench implementation, the first lens 12 is installed on the bench 112 via mounting structure 254. The SLED 52 is installed on a hybrid, which is attached to the bench. The broadband beam is focused by the collimating lens 54 held on mounting and alignment structure 256. This collimates the beam to pass through the etalon 56, which is installed directly to the bench 112. The reference beam generated by the etalon is reflected by fold mirror 58 to the first WDM filter 50. As a result, the combined beam is transmitted to the isolator 61, which is installed directly on the bench 112 in the illustrated implementation.

After the isolator, the focusing lens 60 held on mounting and alignment structure 258 focuses the combined beam onto the tunable filter 18, which is held on the filter mounting and alignment structure 259. In a current implementation, the beam is focused to a spot smaller than 50 μm in diameter at the tunable filter. The beam from the filter 18 is re-collimated by a third collimating lens 62 held on mounting and alignment structure 260. This beam is then separated into the reference beam and the optical signal by WDM filter 64. The reference signal is detected by detector 66. The filtered optical signal is transmitted through the second WDM filter 64 to the signal photodiode 68.

In one implementation, this tunable filter 18 is a MOEMS (micro optical electromechanical system) device, such as described in U.S. Pat. No. 09/649,168, filed on Aug. 25, 2000, entitled Tunable Fabry-Perot Filter, by Flanders, et al., the teachings of which are incorporated herein by this reference in their entirety, although other MOEMS tunable filters, such filters based on other technologies, can be used.

In any case, to be compatible with modem WDM channel spacings, the passband of the tunable filter is preferably less than 100 GigaHertz (GHz) to be compatible with the promulgated ITU grid. In still another embodiment, the bandwidth of the passband is less than 50 GHz to be compatible with the 50 gigahertz offset on the ITU grid. Presently, the passband is less then 10 GHz, preferably about 2 GHz.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical spectral monitoring system, comprising:
   an optical bench;
   fiber pigtails terminating above the bench;
   a tunable filter, connected to the bench, that filters an input optical signal;
   an array of beam switches, connected to the bench, for providing the optical signals from the fiber pigtails as the input optical signal to the tunable filter;
   a detector connected to the bench that detects the filtered input optical signal from the tunable filter.

2. An optical monitoring system as claimed in claim 1, further comprising a hermetic package, wherein at least a portion of the optical bench is sealed by the package.

3. An optical monitoring system as claimed in claim 1, further comprising an isolator for suppressing back reflections into the fiber pigtails.

4. An optical monitoring system as claimed in claim 1, further comprising an isolator installed on the optical bench for suppressing back reflections into the fiber pigtails.

5. An optical monitoring system as claimed in claim 1, further comprising a reference signal source that generates a reference signal that is filtered by the tunable filter.

6. An optical monitoring system as claimed in claim 1, further comprising a reference signal source, installed on the optical bench, which generates a reference signal that is filtered by the tunable filter.

7. An optical monitoring system as claimed in claim 1, wherein the optical bench is smaller than 0.75 inches by 0.5 inches.

8. An optical monitoring system as claimed in claim 1, further comprising collimation lenses between the beam switches and endfaces of the fiber pigtails.

9. An optical monitoring system as claimed in claim 8, wherein the collimation lenses have different focal lengths to compensate different path lengths between the endfaces of the fiber pigtails and the tunable filter.

10. An optical monitoring system as claimed in claim 1, wherein the array of beam switches functions to provide one of the optical signals from the fiber pigtails as the input optical signal to the tunable filter.

11. An optical monitoring system, comprising:
    an optical bench;
    fiber pigtails terminating above the bench;
    a tunable filter, connected to the bench, that filters an input optical signal;
    an array of beam switches, connected to the bench, for providing the optical signals from the fiber pigtails as the input optical signal to the tunable filter, wherein the array of beam switches selectively reflects one of the optical signals to the tunable filter.

12. An optical monitoring system as claimed in claim 1, further comprising a collimating lens between the array of beam switches and the tunable filter.

13. An optical monitoring system as claimed in claim 1, further comprising a focusing lens between the array of beam switches and the tunable filter for coupling the input optical signal into the tunable filter.

14. An optical monitoring system as claimed in claim 1, wherein a passband of the tunable filter is tuned across a signal band of the input optical signal.

15. An optical monitoring system as claimed in claim 1, wherein the tunable filter is electrostatically tuned.

16. An optical spectral monitoring system, comprising:
    optical bench means;
    fiber pigtails terminating above the bench;
    tunable filter means, connected to the bench, for spectrally filtering an input optical signal;
    switch means, connected to the bench, for providing the optical signals from the fiber pigtails as the input optical signal to the tunable filter means; and
    a detector connected to the optical bench means that detects the filtered input optical signal from the tunable filter means.

17. A method of optical signal monitoring, comprising:
    providing optical signals to a hermetic package;
    selectively providing one of the optical signals to a tunable filter within the package; and
    detecting a filtered optical signal from the tunable filter with a detector in the hermetic package.

18. A method as claimed in claim 17, further comprising preventing back reflections into fiber pigtails that provide the optical signals.

19. A method as claimed in claim 17, further comprising generating a reference signal to calibrate the tumble filter.

20. A method as claimed in claim 17, further comprising collimating the optical signals.

21. A method as claimed in claim 17, further comprising focusing one of the optical signal on the tunable filter.

* * * * *